Nov. 30, 1965 G. H. TROTTER 3,220,388
ROTARY INTERNAL COMBUSTION ENGINE
Filed June 21, 1963 3 Sheets-Sheet 1

INVENTOR.
GEORGE H. TROTTER,
BY
McMorrow, Berman + Davidson
ATTORNEYS.

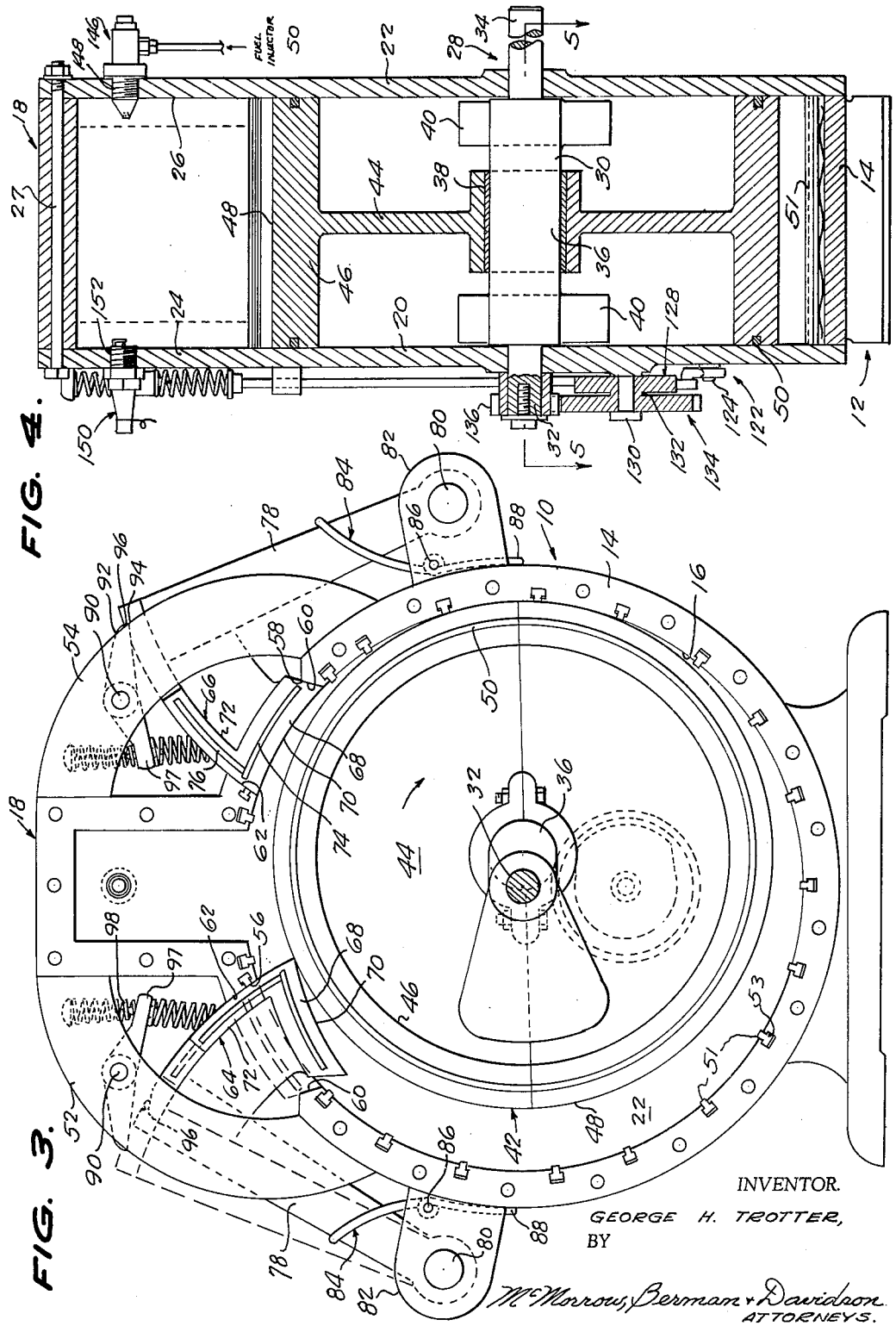

Nov. 30, 1965         G. H. TROTTER         3,220,388
ROTARY INTERNAL COMBUSTION ENGINE
Filed June 21, 1963                     3 Sheets-Sheet 3
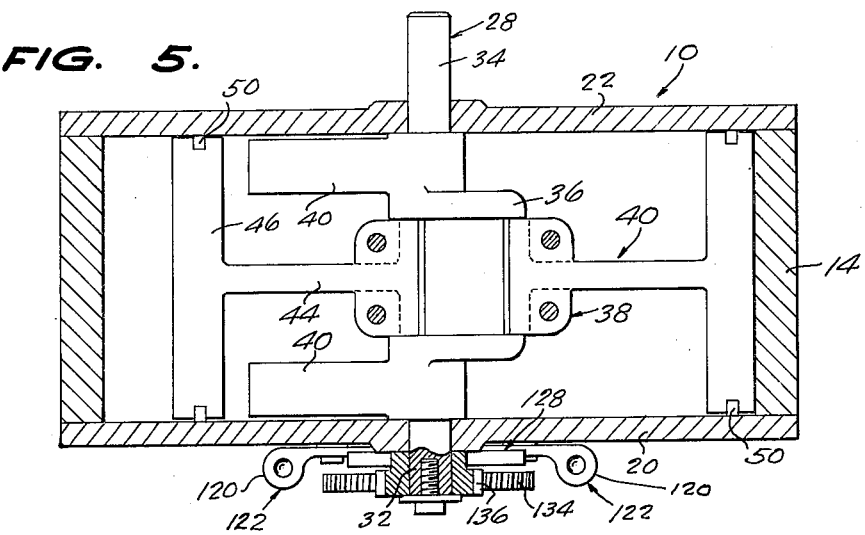
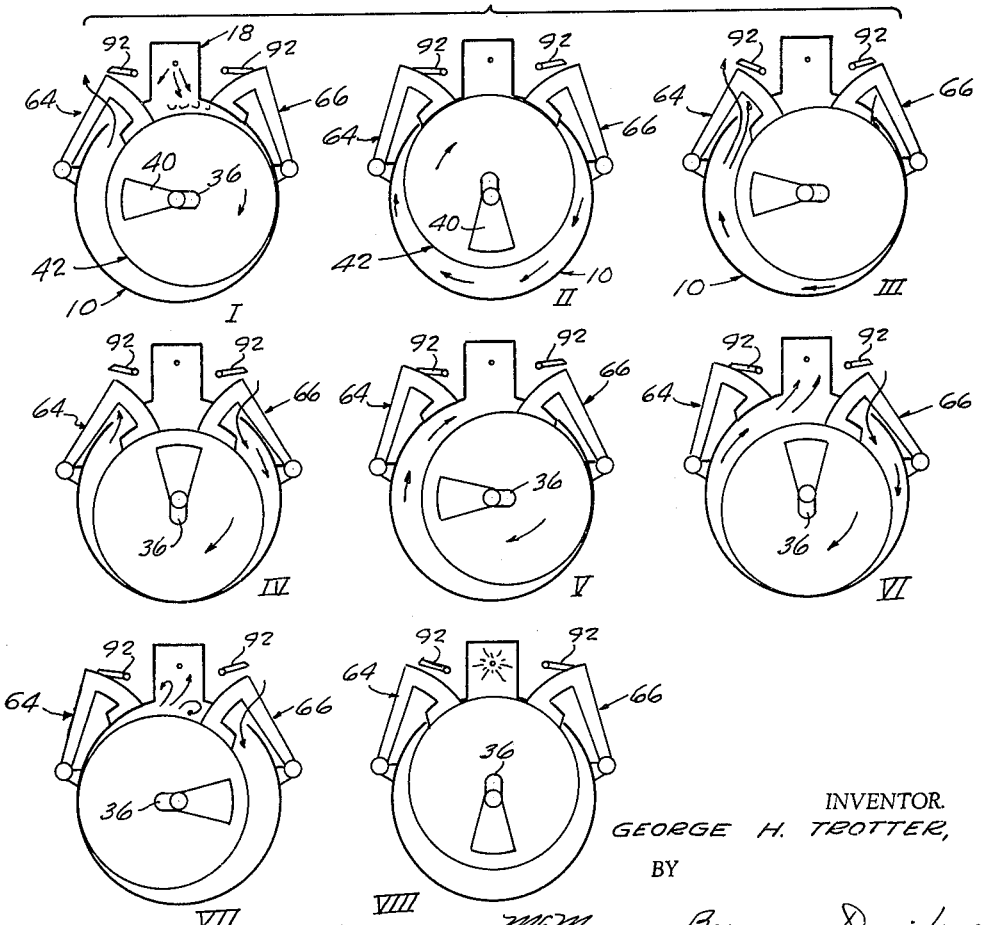
INVENTOR.
GEORGE H. TROTTER,
BY
McMorrow, Berman & Davidson
ATTORNEYS.

United States Patent Office 3,220,388
Patented Nov. 30, 1965

3,220,388
ROTARY INTERNAL COMBUSTION ENGINE
George H. Trotter, Shreveport, La., assignor of one-half to Dwight M. Brown, Taylor W. O'Hearn, and Dwight M. Brown, Jr., all of Caddo Parrish, La.
Filed June 21, 1963, Ser. No. 289,561
8 Claims. (Cl. 123—15)

This invention relates to a novel rotary internal combustion engine.

The primary object of the invention is the provision of a generally improved engine of the kind indicated, which is characterized by greater efficiency, smaller number of operating parts, and substantially reduced operating wear due to reduction of friction between the rotor and its housing.

Another object of the invention is the provision of an engine of the character indicated above, wherein the rotor is rotatably mounted on a crank arm on its shaft, the rotor's edge is in rolling rather than sliding contact with its housing, and compression rings in the sides of the rotor are in minimal contact with the housing.

A further object of the invention is the provision, in an engine of the character indicated above, of novel compression and exhaust valves which are adapted to be in sliding contact with the peripheral edge of the rotor.

A still further object of the invention is the provision, in an engine of the character indicated above, of novel valve timing and operating means, which are adapted to be arranged to different cycles of operation of the engine, such as three or four cycle operations.

Other important objects and advantageous features of the invention will be apparent from the following description and the accompanying drawings, wherein, for purposes of illustration only, a specific form of the invention is set forth in detail.

In the drawings:

FIGURE 3 is a front elevation thereof, with the front plate removed;

FIGURE 4 is a vertical transverse section taken on the line 4—4 of FIGURE 2;

FIGURE 5 is a horizontal section taken on the line 5—5 of FIGURE 4; and,

FIGURE 6 is a group of diagrams of phases of the operation of the engine.

Figure 1:
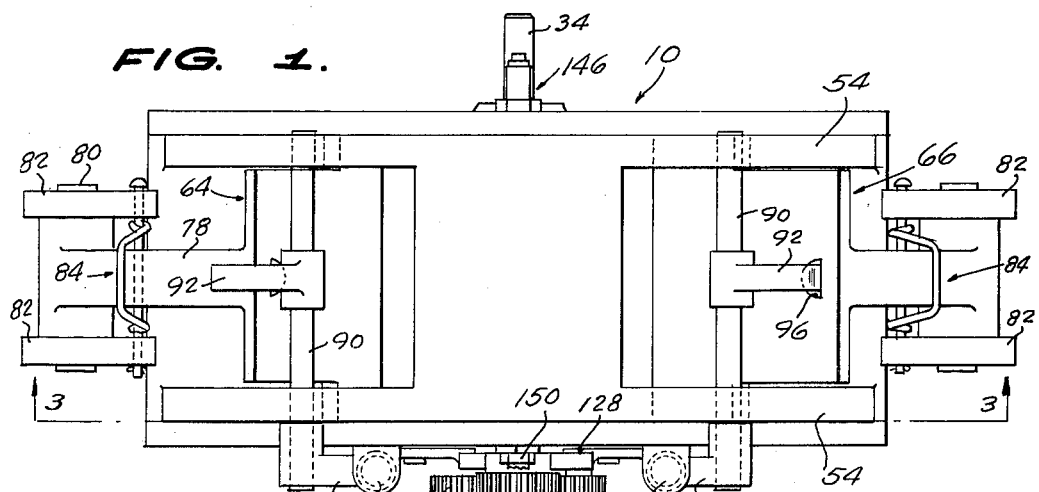
FIGURE 1 is a top plan view of an engine of the present invention.

Referring in detail to the drawings, wherein like numerals designate like parts throughout the several views, the illustrated engine comprises an upstanding substantially cylindrical housing 10, mounted upon a base 12. The housing comprises a cylindrical side wall 14 having a flat cylindrical inner surface 16, and having on its top, a centered radial upstanding inverted U-shaped portion, which defines a fuel intake and ignition chamber 18.

The front and rear sides of the housing 10 are closed by front and back plates 20 and 22, having extensions 24 and 26 which close the front and rear sides, respectively of the chamber 18. The front and back plates are secured in place, as by means of bolts 27 extending through the side wall 16 and the walls of the chamber 18.

A rotary drive shaft 28 is composed of a relatively large diameter intermediate portion 30, and reduced diameter front and rear end portions 32 and 34, which are severally journaled through the centers of the front and back plates 20 and 22, respectively, with the ends of the intermediate portion 30 running close to the inner surfaces of the front and back plates. The intermediate portion 30 is formed with a radial crank throw 36, having an anti-friction bearing 38 thereon. Radial, outwardly flared counterweights 40 are fixed to the intermediate portion 30, at the ends thereof, the longitudinal centerlines of the counterweights being in the same plane as the longitudinal centerline of the throw 36.

A cylindrical rotor 42 is positioned in and is substantially smaller in diameter than the housing 10 and is axially journaled on the throw bearing 38. The rotor comprises a circular disc 44 substantially smaller in thickness than the distance between and is equally spaced from the front and back plates 20 and 22, respectively, and a flat circular rim 46 having a smooth cylindrical peripheral surface 48. Rings 50 are inset in the side edges of the rim and are in contact with the inner surfaces of the front and back plates, and serve the dual purposes of confining within the rotor any lubrication applied to the bearing 38, and preventing seepage of fuel and pressure from the space outside of the rotor, into the interior of the rotor.

Circumferentially spaced, spring-pressed sealing strips 51 are seated in grooves 53 in the inner surface 16 of the housing side wall 14, with which the peripheral surface 48 of the rotor 40 makes rolling, rather than sliding contact, and which serve to maintain compression and or suction between points of contact of the rotor with the side wall, and valves in closed positions of the valves.

Fixed on each side of the chamber 18 are transversely spaced pairs of brackets, consisting of left- and right-hand brackets 52 and 54, respectively, which reach to and are suitably fixed at their lower ends, to portions of the housing side wall 14, at similar distances away from the chamber 18. Rectangular exhaust and air intake ports 56 and 58, respectively, are formed in the housing side wall 14 and related sides of the chamber 18. The ports have downwardly and inwardly angled outer edges 60, and downwardly and inwardly curved inner edges 62, and squared side edges.

Similar but reversed exhaust and air-intake compression valves 64 and 66, respectively, work vertically through the related ports. Each valve comprises a rectangular valve plate 68, fitting its port, when in elevated or closed position, and having an arcuate undersurface 70, adapted to conformably engage the peripheral surface 48 of the rotor, when depressed out of the related port. An arcuate stem 72, of the same width as the plate 68, extends upwardly and outwardly from the upper end of the plate. The side edges of the plate 68 and of the stem 72 have inset therein bearing and sealing strips 74 and 76, respectively, adapted to, at times bear against the sides of the related port and the inner surfaces of the related brackets 52, 54.

Centered levers 78 are fixed to and extend downwardly and outwardly from the upper ends of the valve stems 72, which are fixed, at their lower ends, on pins 80, which are journaled through and extend between pairs of ears 82, extending radially outwardly from the housing side wall, the pins 80 being located at the centers of curvature of the valve stems 72. Springs 84, which serve to bias the valves downwardly against the peripheral surface 48 of the rotor 42, embrace the outer sides of the levers 78, above the ears 82, are coiled around pins 86, which extend between the ears 82, in the space between the pins 80 and the housing side wall 14, and have downwardly extending arms 88 which bear against the outer surface of the side wall 14, below the ears 82.

Figure 2:
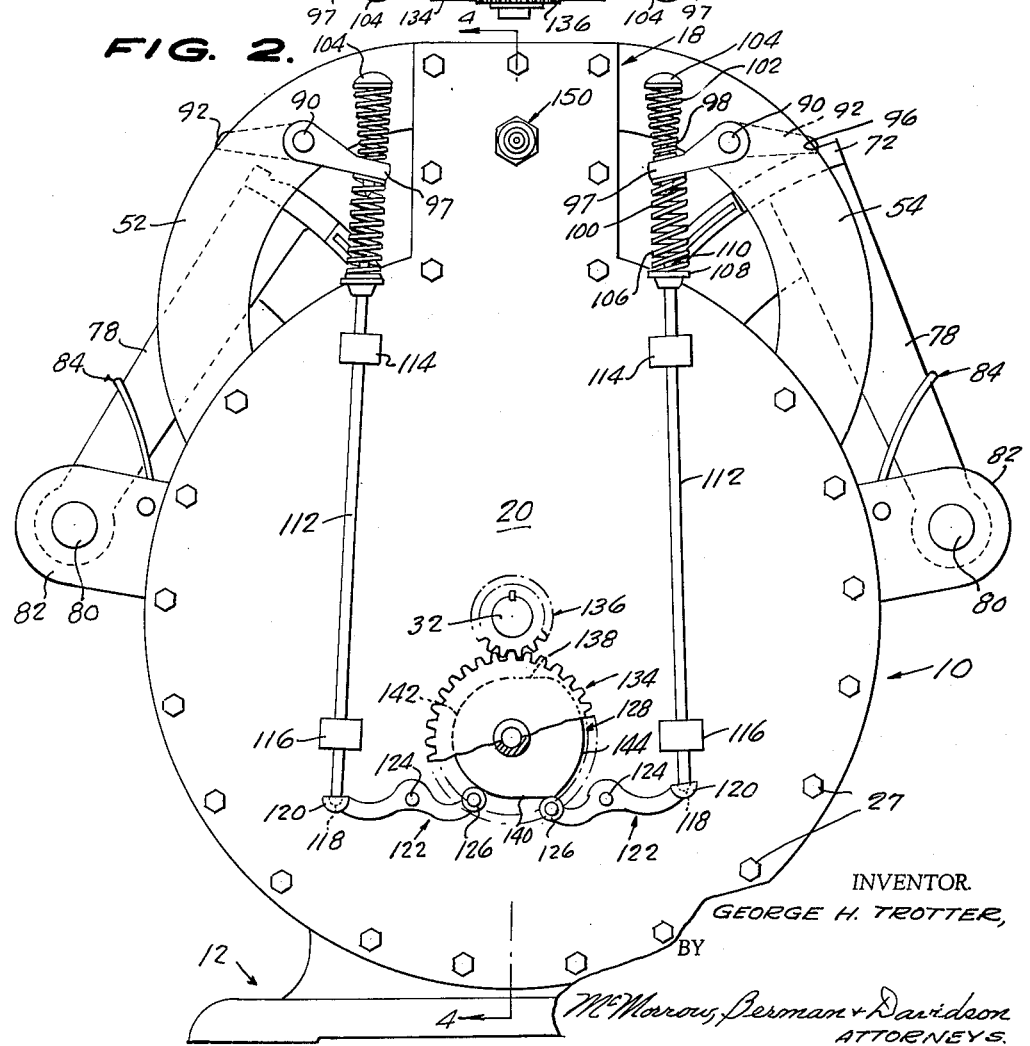
FIGURE 2 is a front elevation thereof.

Transverse tappet shafts 90 are journaled through the brackets 52 and 54, above the valve stems 72 and spaced outwardly from the sides of the chamber 18, on which are fixed, between related brackets, outwardly extending and outwardly tapered detent arms 92, having tapered tips 94 which are adapted, at times, to engage in detent recesses 96, formed in the upper surfaces of the valve stems 72, near their outer ends, as shown in FIGURES 1, 2 and 3, for holding the related valve, against the resistance of the related spring 84, in its elevated port-closing position.

Fixed on the forward ends of the tappet shafts 90 are tappet arms 97, which extend inwardly along the front side of the front plate 20, and have upwardly and downwardly extending spring anchoring cones 98 and 100, respectively. Upper coil springs 102 are secured, at their upper ends, to lugs 104 projecting forwardly from the front ones of the brackets 52, 54 and are seated, at their lower ends, on the upper tappet arm cones 98. Lower coil springs 106 are seated, at their upper ends, around the lower tappet arms cones 100, and bear, at their lower ends, upon tappet rod rollers 108, having upstanding retaining pins 110 engaged in the lower ends of the lower springs 106.

The collars 108 are fixed on the upper ends of tappet rods 112 which work through upper and lower brackets 114 and 116, respectively, on the front housing plate 20, and have rounded lower ends 118, which seat pivotally in cups 120, on the outer ends of rockers 122. The rockers 122 are pivoted, intermediate their ends, as indicated at 124, on the front housing plate 20. On the inner ends of the rockers 122 are rollers 126, which are engaged with the periphery of a rotary cam 128.

The cam 128 is retainably journaled on a transverse stub shaft 130 positioned below and vertically aligned with the drive shaft 28 and anchored on the front housing plate 20. Also journaled on the stub shaft 130, in front of the cam 128, and fixed, as indicated at 132 to the cam, is a timing gear wheel 134. The gear wheel 134 is in mesh with a pinion 136 which is fixed on the front end of the drive shaft 28.

As shown in FIGURE 2, the cam 128 has opposed relatively flat peripheral edge portions 138 and 140, which converge toward a relatively narrow arcuate end portion 152, from a relatively wide arcuate end portion 144.

Combustible fuel is supplied to the chamber 18, by means of a horizontal injection nozzle 146, threaded, as indicated at 148, through the back housing plate 22. Ignition of a fuel and air mixture, in the chamber 18, is obtained by means of a spark plug 150, threaded, as indicated at 152, through the front housing plate 20. Suitable operative connections, not shown, between the spark plug and the injection nozzle and the timing gears of the engine, are contemplated, so as to provide for their operation at the proper stages of operation of the engine.

In operation, reference is made to the diagrams of FIGURE 6, which show sequences of phases of operation of the hereinabove described engine:

Diagram I shows the position of the rotor 42 immediately after explosion of the fuel mixture in the chamber 18, the exhaust valve 64 depressed and engaged with the rotor 42, and the intake valve 66 elevated and closing its port 52, the port 56 being open to allow the discharge, through the port 56, of air and expended products of combustion to pass out of the housing 10. The discharge valve 64 thus blocks, at the adjacent side of the chamber 18, the space between the housing side wall and the rotor, and the elevation of the air intake valve 66 and its port 58, provide for the exploding fuel to emerge from the chamber 18 and act upon the peripheral surface of the rotor 42, at the other side of the chamber. Since the rotor shaft throw 36 is in a horizontal position, at the same side of the impinging gases, the rotor 42 is pushed downwardly and rotated in a clockwise direction and the intake valve 66 is held closed by the arms 92. The momentum inherent in the rotor 42 and enhanced by the counter-weights 40 gives the rotor flywheel action, and maintains its rotation through succeeding phases, as the gases continue to expand.

From the position shown in Diagram I, the rotor 42 moves to an extreme depressed position, and from that position to its extreme elevated position, shown in Diagram II. As the rotor passes the intake valve 66, its arm 92 is released therefrom and permits the valve to engage the rotor, and the exhaust valve 64 continues to ride the rotor.

Diagram III shows the rotor 42 further advanced from the position of Diagram II and both valve ports open and the valves riding the rotor under tension of the springs 84, the exhaust port 56 being open and discharging burned gases.

As the rotor reaches the position shown in Diagram IV, exhaust of gases is continuing, while outside air is being intaken through the port 58, and on further rotation of the rotor 42, to the extreme right-hand position of Diagram V, the exhaust valve 64 is locked by its arm 92, in closed position, with the intake valve 66 continuing to ride the rotor and thereby blocking the space between the rotor and the housing 10, at the right-hand side of the chamber 18, so that further rotation of the rotor compresses the air present in the space between the housing and the left-hand side and top of the rotor and in the chamber, as shown in Diagram V.

The rotor 42 on further rotation, moves to the extreme depressed position, shown in Diagram VI, wherein the rotor is still compressing air, with the exhaust valve 64 locked closed, and with the intake valve 66 in open position and riding the rotor 42. This draws air into the space between the right-hand side of the rotor and the housing, and this continues, as shown in Diagram VII, until substantially all of the air first compressed at the left-hand side of the rotor has been compressed into the chamber 18, and further air is drawn into the housing at the right-hand side of the rotor.

Further rotation of the rotor to the extreme elevated position shown in Diagram VIII releases the exhaust valve 64 to ride the rotor 42 and elevates and locks the intake valve 66 in closed position, and the spark plug 150 is energized and ignites the compressed fuel and air mixture in the chamber 18. This mixture was formed by the injection of fuel by the nozzle 146 as the rotor approaches its extreme elevated position. The expansion of the ignited fuel mixture then acts to rotate the rotor to the position shown in Diagram I, which is the beginning of the power stroke.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and an air intake ports at the opposite sides of the chamber, exhaust and intake valves movably supported on the housing at opposite sides of the chamber for closing and opening the ports, and a mechanism operatively connected to the drive shaft and to the valves for use in operating said valves in timed relation to movement of said rotor.

2. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, and spring means urging the valves toward open positions and toward sliding contacts with the peripheral edge of the rotor.

3. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, spring means urging the valves toward open positions and toward sliding contacts with the peripheral edge of the rotor, detent means for locking the valves in closed positions, and means operatively connecting said mechanism with the detent means.

4. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, spring means urging the valves toward open positions and toward sliding contact with the peripheral edge of the rotor, detent means for locking the valves in closed position, and means operatively connecting said mechanism with the detent means, said mechanism including a cam journaled on the housing and operatively connected to the drive shaft, a pair of rockers pivoted intermediate their ends on the housing and having rollers on one end thereof bearing against the peripheral edge of the cam, and tappet rods having one end thereof operatively engaged with the other ends of the rockers, the other end of said tappet rods being operatively connected to said detent means.

5. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, spring means urging the valves toward open positions and toward sliding contact with the peripheral edge of the rotor, detent means for locking the valves in closed position, and means operatively connecting said mechanism with the detent means, said mechanism including a cam journaled on the housing and operatively connected to the drive shaft, a pair of rockers pivoted intermediate their ends on the housing and having rollers on one end thereof bearing against the peripheral edge of the cam, tappet rods having one end thereof operatively engaged with the other ends of the rockers, tappet shafts journaled on the housing at opposite sides of the chamber adjacent to the valves, said detent means comprising tappet arms extending radially from the tappet shafts, the valves being formed with detent recesses into which the arms are adapted to engage to lock said valves in closed positions.

6. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, said valves comprising valve plates having arcuate under surfaces for conforming and sliding engagement with the peripheral edge of the rotor, stems rising from one end of the valve plates, downwardly extending levers fixed to the stems, and means journaling the levers at their lower ends on the housing side wall.

7. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral side wall against which the peripheral edge of the rotor is in rolling contact, said side wall having a radial extension defining a combustion chamber, means connected to the chamber for introducing fuel therein, igniting means in the chamber for igniting a mixture of fuel and air therein, said housing side wall having exhaust and air intake ports at the opposite sides of the chamber, exhaust and intake valves movably supported on the housing at opposite sides of the chamber for closing and opening the ports, a mechanism operatively connected to the drive shaft and to the valves for use in operating said valves in timed relation to movement of said rotor, said valve comprising valve plates having arcuate under surfaces for conforming and sliding engagement with the peripheral edge of the rotor, stems rising from one end of the valve plates, downwardly extending levers fixed to the stems, and means journaling the levers at the lower ends on the housing side wall, and spring means comprising springs embracing lower parts of the levers above their pivotal axes and securably engaged with the exterior of the housing side wall below these axes.

8. A rotary internal combustion engine comprising a cylindrical housing, an axial drive shaft journaled across the housing and having a crank throw within the housing, a cylindrical rotor smaller in diameter and axially journaled on the throw, said housing having a cylindrical peripheral wall in contact with the peripheral edge of the rotor, said side wall having a radial extention defining a combustion chamber, means connected to the chamber for introducing fuel therein, igniting means in the chamber for igniting a mixture of fuel and air therein, said housing side wall having an exhaust and an air intake port at the opposite sides of the chamber, exhaust and intake valves movably supported on the housing at opposite sides of the chamber for closing and opening the ports, and a mechanism operatively connected to the drive shaft and to the valves for use in operating said valves in timed relation to movement of said rotor.

References Cited by the Examiner

UNITED STATES PATENTS

| | | | |
|---|---|---|---|
| 859,474 | 7/1907 | Williams | 123—15 |
| 1,309,096 | 7/1919 | Leibing | 123—15 |
| 1,363,451 | 12/1920 | Blackman | 103—130 |
| 2,117,662 | 5/1938 | Heinze | 123—8 |
| 2,154,095 | 4/1939 | Jones | 123—14 |

FOREIGN PATENTS 471,071   7/1914   France.

DONLEY J. STOCKING, *Primary Examiner.*

KARL J. ALBRECHT, *Examiner.*